United States Patent [19]

Diepens et al.

[11] Patent Number: 5,411,588
[45] Date of Patent: May 2, 1995

[54] DEVICE FOR PROCESSING DISC-SHAPED REGISTRATION CARRIERS

[75] Inventors: Petrus J. F. Diepens, Hg Son; Joost Van Erp, CG Eindhoven; Michael A. T. Hompus, MD Eindhoven, all of Netherlands

[73] Assignee: OD & ME B.V., Eindhoven, Netherlands

[21] Appl. No.: 77,524

[22] Filed: Jun. 16, 1993

[30] Foreign Application Priority Data

Jun. 16, 1992 [NL] Netherlands .................. 9201065

[51] Int. Cl.6 ............................................. B05C 11/00
[52] U.S. Cl. ........................................ 118/666; 34/275; 74/25; 74/55; 74/107; 118/319; 118/320; 118/321; 118/670; 118/704; 118/712; 198/468.6; 198/478.1; 250/504 R; 356/237
[58] Field of Search .................. 118/319–321, 118/668, 712, 679, 670, 704, 666; 414/224–226; 901/6; 356/237; 34/7, 1 Y, 1 AA; 198/468.6, 478.1, 346 R, 445.1; 74/25, 107, 55; 250/504 R, 492.1

[56] References Cited

U.S. PATENT DOCUMENTS

| | | | |
|---|---|---|---|
| 3,675,563 | 7/1972 | Metreaud | 118/319 X |
| 4,162,126 | 7/1979 | Nakagawa et al. | 356/237 |
| 4,421,987 | 12/1983 | Herold | 250/504 R X |
| 4,538,909 | 9/1985 | Bible et al. | 356/237 |
| 4,674,875 | 6/1987 | Koizumi | 356/237 |
| 4,697,688 | 10/1987 | Kimbell et al. | 198/346.2 |
| 4,787,814 | 11/1988 | Vaerman | 198/346.2 X |
| 4,789,238 | 12/1988 | Ichikawa et al. | 356/237 |
| 4,798,960 | 1/1989 | Keller et al. | 250/504 R |
| 5,069,155 | 12/1991 | Kunze-Concewitz et al. | 118/52 |
| 5,127,362 | 7/1992 | Iwatsu et al. | 118/712 X |
| 5,232,505 | 8/1993 | Novak et al. | 118/712 |
| 5,249,034 | 9/1993 | Minato | 356/237 X |

FOREIGN PATENT DOCUMENTS

0152165 3/1989 European Pat. Off. .

*Primary Examiner*—Robert J. Warden
*Assistant Examiner*—Krisanne M. Thornton
*Attorney, Agent, or Firm*—Cushman Darby & Cushman

[57] ABSTRACT

The invention relates to a device for processing disc-shaped registration carriers, provided with a number of processing stations in which the disc-shaped registration carriers are supported, and with a transport assembly by which said disc-shaped registration carriers can be moved from one processing station to another processing station. The transport assembly is fitted with interconnected, jointly driven holders for simultaneously taking hold of and moving the registration carriers between the processing stations. The processing stations are at least partially fitted with readily exchangeable processing units.

25 Claims, 10 Drawing Sheets

DEVICE FOR PROCESSING DISC-SHAPED REGISTRATION CARRIERS

FIELD OF THE INVENTION

A device for processing disc-shaped registration carriers.

BACKGROUND OF THE INVENTION

The invention relates to a device provided with a number of processing stations, which are arranged along a curved path, spaced apart by at least substantially equal angular distances, with a transport means which is pivotable about a vertical axis of rotation, said transport means being fitted with gripping means for taking hold of and moving products to be processed between the various processing stations, and with driving means for said pivotable transport means, by which said transport means is pivotable in a first direction, so as to be able to move said gripping means to a position above a product located in a processing station, upon which the transport means is pivotable in opposite direction, so as to be able to transfer the product from one processing station to a following processing station.

Such a device is known from DE-A-3709354. In this known device the gripping means are secured to a carrier, which can be moved upward and downward by means of a vertically disposed setting cylinder. The use of such a setting cylinder leads to a comparatively heavy construction, which takes up a lot of space.

The object of the invention is in particular to obtain a device suitable for processing disc-shaped registration carriers, which are generally relatively thin and weigh little.

SUMMARY OF THE INVENTION

According to the invention, the processing stations are fitted with supporting means for supporting disc-shaped registration carriers. At least some of said processing stations are fitted with readily exchangeable processing units. The invention includes transport means which comprise an annular means pivotable about the axis of rotation. Gripping means are connected to the annular means and both are capable of reciprocating pivotable movement by means of a driving mechanism. The annular means is rotatably supported by a second annular means, which is rotatable with respect to a third annular means, the second or third annular means is provided with a wave-shaped guide path, which mates with a follow-on means connected to said third or said second annular means, while said third annular means is likewise capable of reciprocating movement by means of a driving mechanism.

When using the construction according to the invention, movement of the gripping means from the one processing station to the following processing station, and vice versa will automatically effect an upward and downward movement of the gripping means as well, by way of simple annular means, which take up comparatively little space, whereby the gripping means will occupy their highest position when located between two successive processing stations. In this highest position between two processing stations, the position of the gripping means will furthermore be such that the gripping means do not interfere with the exchange of processing units. By using the invention a device of simple construction is thus obtained, by means of which an effective quick movement of the disc-shaped registration carriers can be effected during operation. It is also possible to adapt the device in a quick and simple manner to the activities to be performed by exchanging processing units.

According to an efficient embodiment of the invention, the supporting means for the disc-shaped registration carriers are arranged along a curved path, spaced apart by at least substantially equal angular distances. The transport means is pivotable about a vertical axis of rotation and is fitted with gripping means for taking hold of and moving the disc-shaped registration carriers between the various processing stations. The driving means for the pivotable transport means are constructed in such a manner, that from a rest position of the transport means, in which the gripping means are located between the processing stations, seen in the direction of the vertical axis of rotation, the transport means can be pivoted in a first direction thus positioning the gripping means above the disc-shaped registration carriers present in the processing stations. In that position the gripping means can pick up the disc-shaped registration carriers, upon which the transport means can be pivoted in opposite direction so as to be able to transfer the disc-shaped registration carriers from one processing station to a following processing station. Thereafter, the transport means can be pivoted back in the first direction again, towards the rest position.

BRIEF DESCRIPTION OF THE DRAWINGS

The invention will be explained in more detail hereafter with reference to a possible embodiment of a device according to the invention diagrammatically illustrated in the accompanying figures.

DETAILED DESCRIPTION OF THE PREFERRED EXEMPLARY EMBODIMENT

Figure 1:
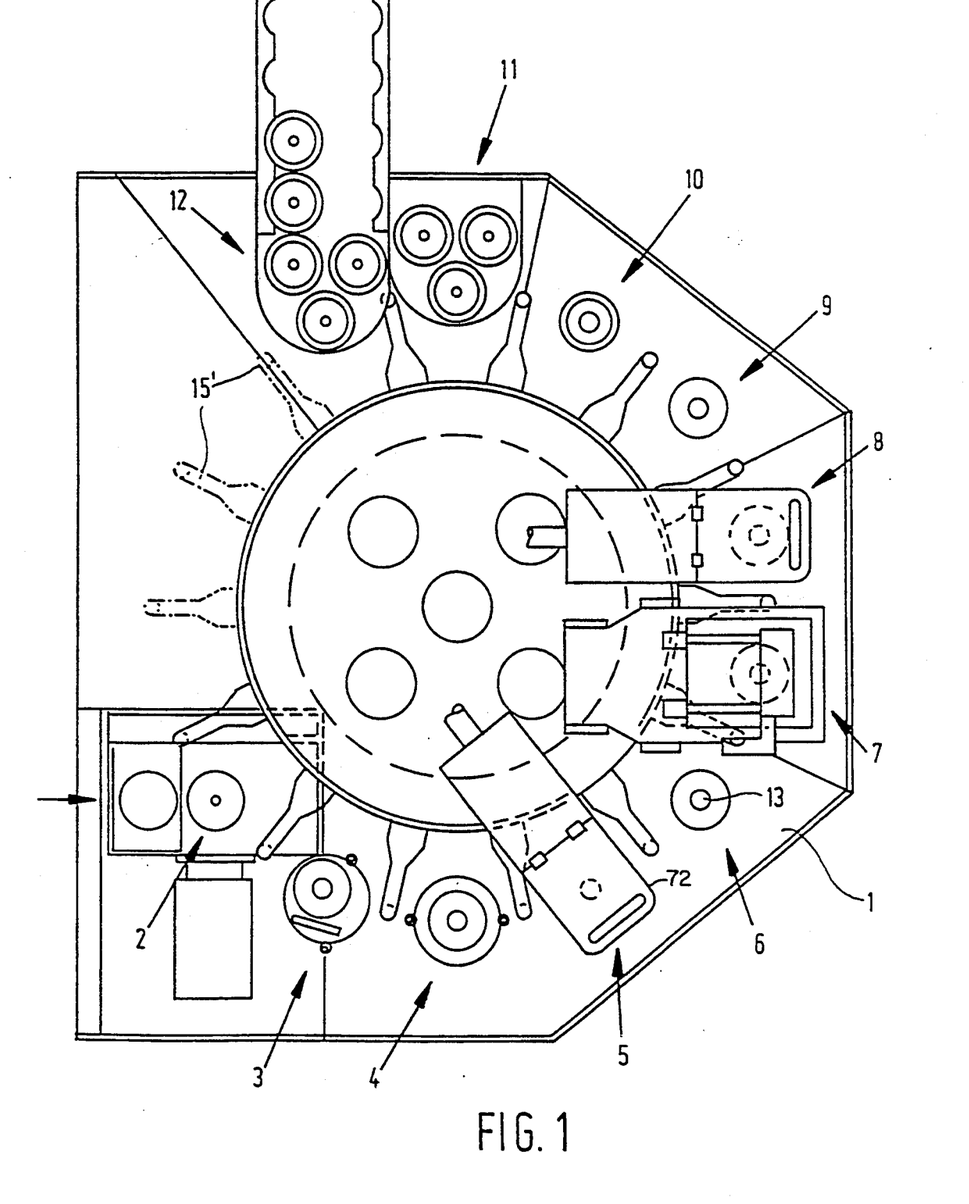
FIG. 1 is a diagrammatic plan view of an embodiment of a device according to the invention.

The device shown in FIG. 1 comprises a frame 1, which functions to support a number of stations in which disc-shaped registration carriers, in particular so-called compact discs, can be processed and/or checked. In a first station 2, the disc-shaped registration carriers coming from an injection molding machine are provided with a metal coating. Since means which are known per se are used for this purpose, the specific construction of the means which apply said metal film in station 2 will not be discussed in more detail herein.

In a second station 3, an amount of paint is provided on the upper surface of the carrier, as will be described in more detail hereafter.

In station 4 the carrier, with the amount of paint provided thereon, is made to rotate fast in order to distribute the paint evenly over the carrier surface.

Station 5 comprises a device yet to be described in more detail hereafter for curing and/or drying the paint.

In the illustrated embodiment, station 6 does not comprise any means for processing the carrier. Both in this station and in the various other stations, however, a processing unit, preferably of a type which is readily exchangeable, may be provided as desired.

In station 7, a preferably exchangeable processing unit, which is known per se and according will not be discussed in more detail herein, in the shape of a printing device is provided for applying a print on the carrier.

This may, for example, be a screen printing device or a dabber printing device. When the time required for printing is longer than the cycle time of the device, a removing means may, for example, be provided near station 7, which supplies the successive carriers to a printing device disposed at some distance from station 7, and returns carriers printed in said printing device to station 7. With a correct adjustment it can be ensured that within the cycle time of the machine, a plain carrier is removed at station 7 and a printed carrier is introduced, whereby a few carriers may be present near the printing device.

Furthermore, it is possible, for example, for multicolor printing, to provide printing devices working with different colors in various stations, possibly with drying and/or curing devices provided therebetween.

It is also possible that a printing device is disposed in two successive stations, whereby the printing device in the one station is in use while the one in the other station is, for example, being exchanged or repaired, which likewise contributes towards increasing the capacity of the device.

In station 8, a processing unit is provided for drying and/or during the print applied. This drying unit may, for example, correspond with the drying unit provided in station 5.

In the illustrated embodiment no carrier processing means are provided in station 9, although also here any desired processing unit may be provided, of course.

Figure 10:
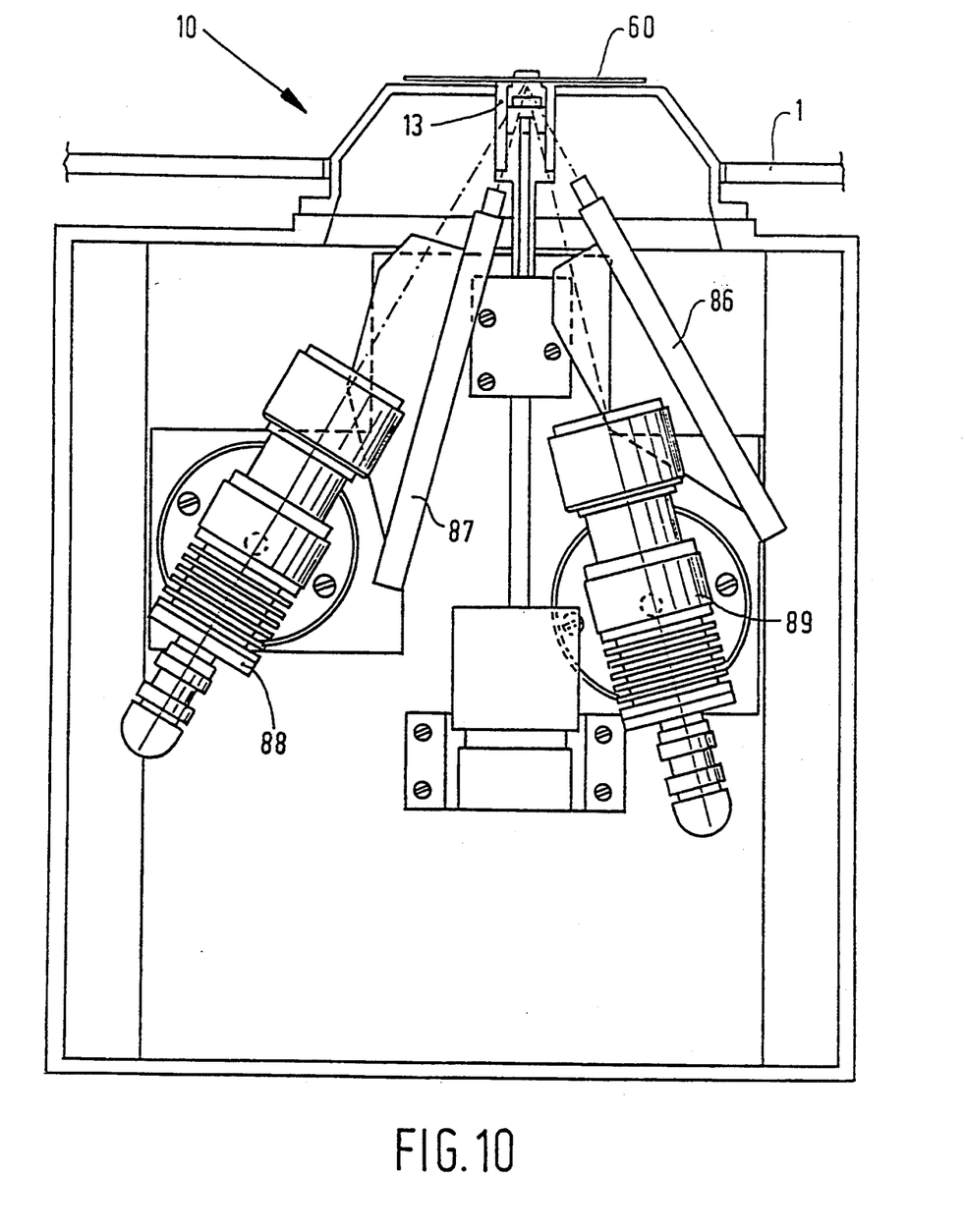
FIG. 10 is a diagrammatic illustration of a station for checking a registration carrier.
Figure 11:
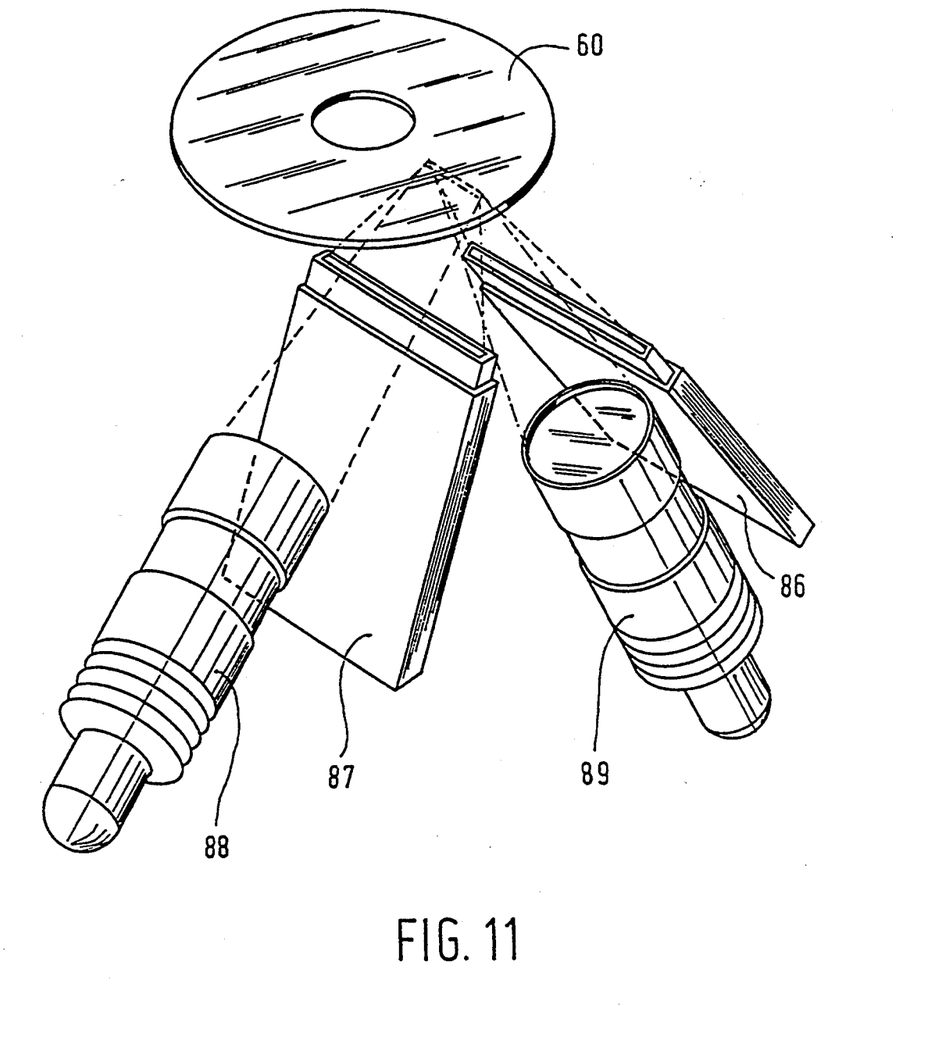
FIG. 11 is a perspective view of parts of the station shown in FIG. 10.

In station 10, a scanning device, yet to be discussed in more detail hereafter with references to FIGS. 10 and 11, may be provided for checking the disc-shaped registration carrier.

Station 11 is provided with means known per se for discharging rejected carriers.

Station 12 is provided with means known per se for discharging approved carriers.

Each of the stations is provided with a supporting means 13, diagrammatically illustrated in FIG. 1, on which a disc-shaped registration carrier to be processed and/or checked in the respective station can be placed. The supporting means 13 may have a different, individually adapted construction for each station. The supporting means 13, for example, may be a gripper, which engages the outer circumference of the carrier or an opening provided in said carrier, or a suction cup. As will be apparent from FIG. 1 thereby, said supporting means 13 are arranged in an arc of a circle, in such a manner that the respective angular distances between two successive supporting means 13 are all the same.

Figure 2:
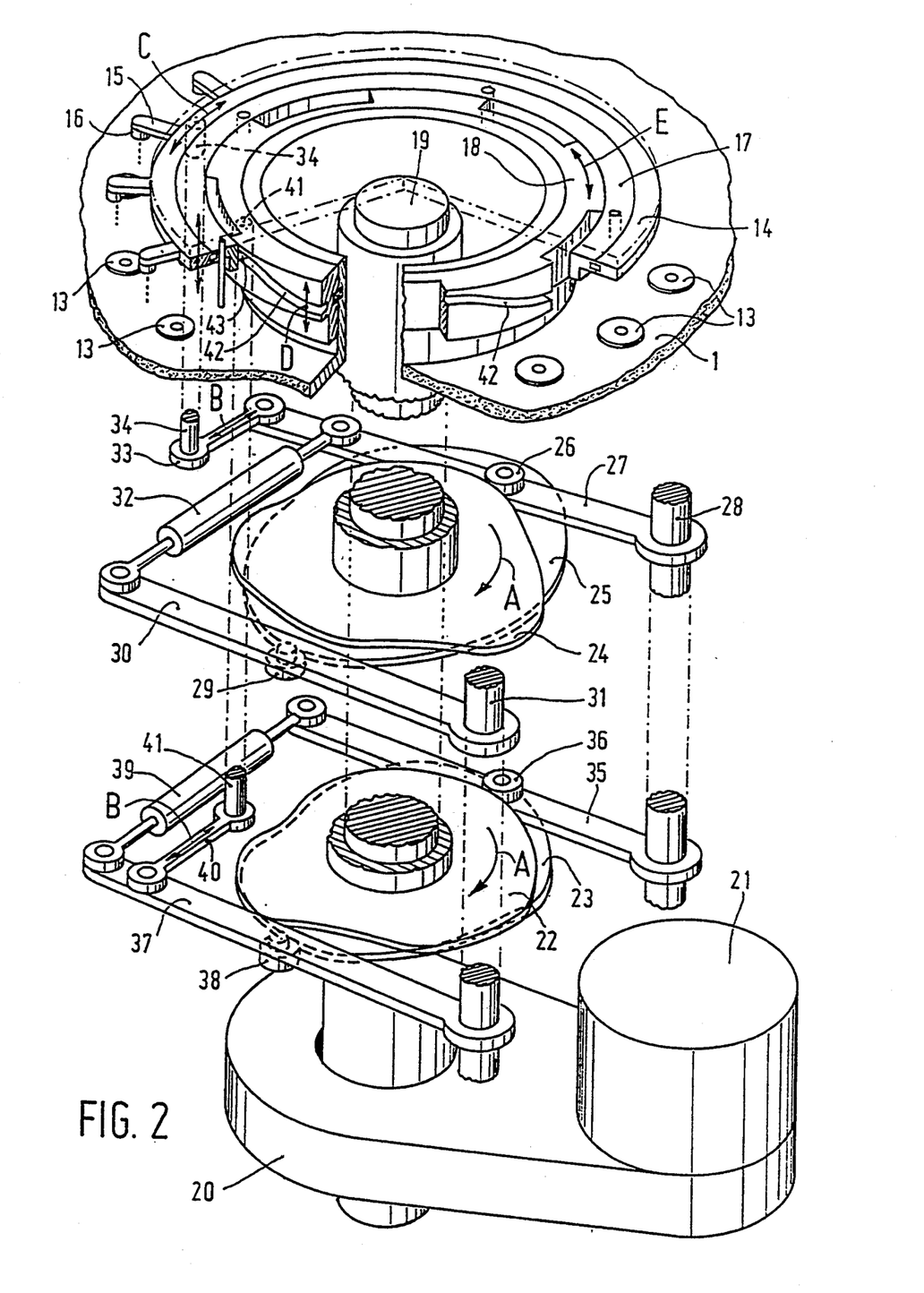
FIG. 2 is a perspective view, cut away in parts, of a part of the driving mechanism of the device according to the invention.

For moving the disc-shaped sound and/or picture carrier between the successive stations 2–12 use is made of a transport means comprising an annular means 14 (FIG. 2). Radially extending arms 15 are secured to the annular means 14 and at their free ends support gripping means 16 (only diagrammatically indicated in FIG. 2) for taking hold of the disc-shaped registration carriers. The gripping means may, for example, be constructed to engage the central hole provided in such carriers, or the gripping means may be constructed in the shape of suction cups, in which a vacuum can be generated.

The annular means 14 is supported by a further annular means 17 so as to be rotatable about a vertical axis of rotation, with annular means 17 in turn being supported and capable of upward and downward movement by an annular means 18 rotatably supported by the frame of the device.

A vertical driving shaft 19, which is journalled in the frame, is provided for rotating the two annular means 14 and 18, whereby the driving shaft can be driven by means of a motor 21 via a gearing accommodated in a box 20.

A first pair of cam discs 22, 23 and a second pair of cam discs 24, 25 are secured to the shaft 19.

Cam disc 24 cooperates with a cam roller 26, which is provided on an arm 27, one end of which is pivotally mounted on a shaft 28 which extends parallel to the shaft 19.

A cam roller 29 is mounted on an arm 30 and cooperates with cam disc 25. One end of arm 30 is pivotally mounted on a shaft 31 which extends parallel to the shaft 28.

The two arms 30 and 27 are coupled together, in the manner shown in FIG. 2, by means of a spring mechanism 32 tending to move the arms towards each other and keeping the cam roller 26 and 29 in firm contact with the outer circumference of the cam discs 24 and 25, respectively.

An end of a coupling rod 33 has been pivotally coupled to the free end of the arm 27.

The other end of the coupling rod is connected with the annular means 14 by means of a rod 34 extending parallel to the shaft 19.

A further arm 35 is pivotable about the shaft 28. A cam roller 36 is mounted on the arm 35 so as to cooperate with the outer circumference of the cam disc 22.

A further arm 37 is pivotable about the shaft 31. A cam roller 38 is provided on the arm 37 and cooperates with the outer circumference of the cam disc 23.

The free ends of the arms 35 and 37 are interconnected by means of a spring mechanism 39, which attempts to move the respective ends of the arms 35 and 37 towards each other, so that the cam rollers 36 and 38 are kept in firm contact with the outer circumferences of the cam discs 22 and 23, respectively.

One end of a coupling rod 40 is pivotally coupled to the arm 37. The free end of the coupling rod 40 is connected to the annular means 18 by means of a rod 41 extending parallel to the shaft 19.

As is furthermore apparent from FIG. 2, a guide slot 42, extending in the shape of a wave, is provided in the outer circumference of the annular means 18 supporting the annular means 17, whereby guide pins 43, which are secured to the annular means 17 and which extend horizontally and radially with respect to the central axis of the shaft 19, engage guide slot 42.

When shaft 19 is rotated, cam discs 22, 23, 24 and 25 will likewise be rotated in the direction according to arrow A. It will be apparent that because of this rotary motion of the shaft 9, the arms 27 and 30, as well as the arms 35 and 37, will be pivoted to and fro about the respective shafts 28 and 31. As a result of this also, the coupling rods 33 and 40 with the rods 34 and 41 secured thereto will be moved to and fro, as indicated by means of the double arrows B.

The reciprocating movement of the rod 34 connected to the annular means 14 causes the annular means 14 and the gripping means 16 secured thereto to pivot to and fro about the central axis of the shaft 19, as indicated by means of the double arrow C. The amount of travel of an arm 15 secured to the annular means 14 and the gripping means 16 connected thereto equals the center-to-center distance between two neighboring supporting means 13.

The reciprocating movement of rod 41 is transmitted to annular means 18 so that it pivots to and fro about the central axis of the shaft 19, as indicated by means of the double arrow E. Since the annular means 17 is guided in the wave shaped slot 42 by means of the pins 43, the reciprocating pivotable movement of the annular means 18 will also cause annular means 17 to make a reciprocating movement in a vertical direction. Since annular means 14 is supported by annular means 17, annular means 14 will be moved upward and downward parallel to the shaft 19, as indicated by means of the double arrow D.

The construction is such that in the rest position of the gripping means 16, said gripping means are located centrally between the supporting means 13, seen in the longitudinal direction of the shaft 19, taking up their uppermost position thereby. For moving the disc-shaped registration carriers supported on the supporting means from a supporting means 13 to a next supporting means 13 the gripping means 16 are first pivoted in a first direction, for example, clockwise, seen in FIG. 2, in such a manner that the gripping means 16 are pivoted to a position above the respective supporting means, suitable for taking hold of the carriers present on the respective supporting means. After the gripping means 16 have taken hold of the carriers in question, the annular means 14 and the carrier are pivoted in an opposite direction, i.e., anti-clockwise, until the gripping means 16 and the carriers supported by the gripping means have reached a position in which the carriers can be delivered to a next supporting means. After that, the annular means 14 and the gripping means 16 supported by said annular means are pivoted back in the first direction until the gripping means 16, seen in the direction of the shaft 19, are located centrally between the supporting means 13 again. Subsequently, the processing and-/or checking of the disc-shaped registration carriers in the respective stations can be started again.

The construction of cam discs 22, 23, 24 and 25 is such that when the gripping means do not support any registration carrier, they are moved faster than when they support a registration carrier, so that the shortest transport times possible can be realized.

Possibly, using suitable driving means, the arms 15 may be designed to telescope radially, so that the stations can be arranged at different distances from the shaft 19.

Figure 3:
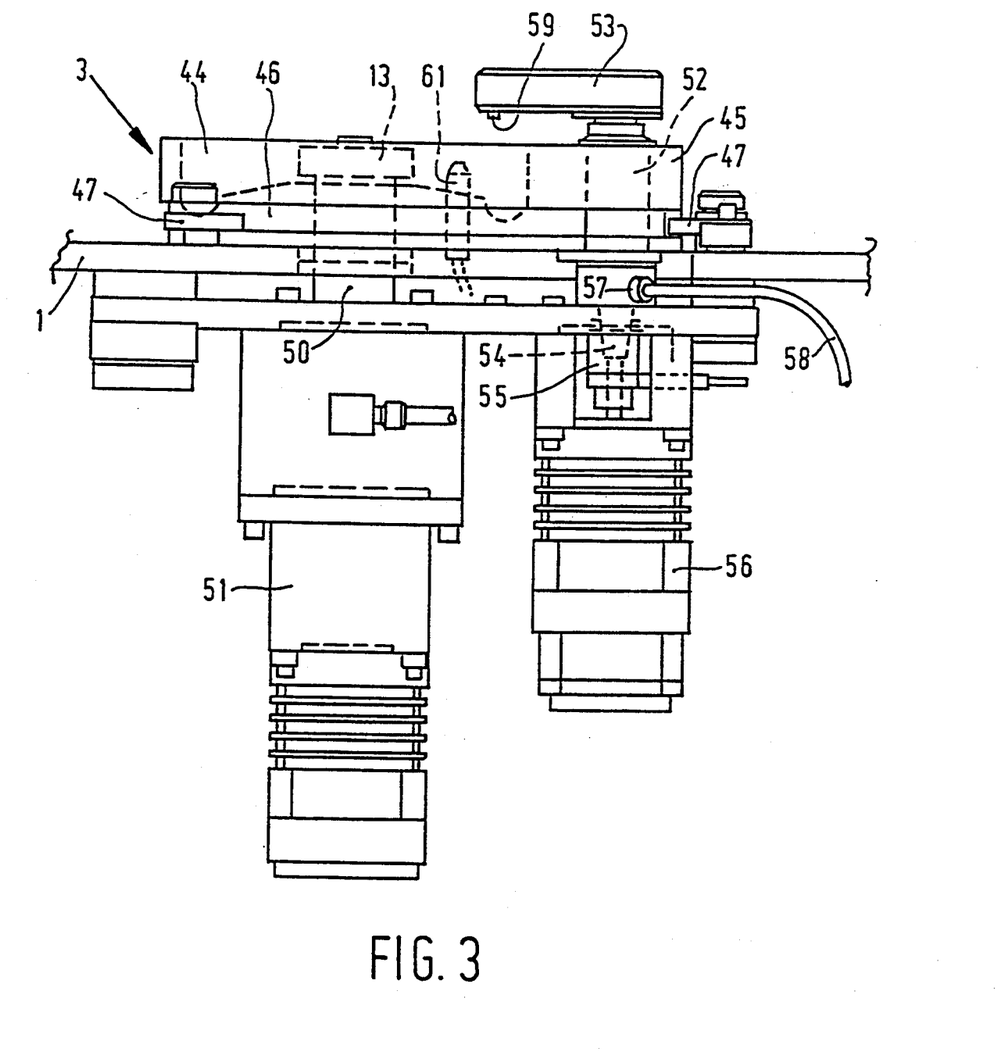
FIG. 3 is a diagrammatic elevational view of a processing station.
Figure 4:
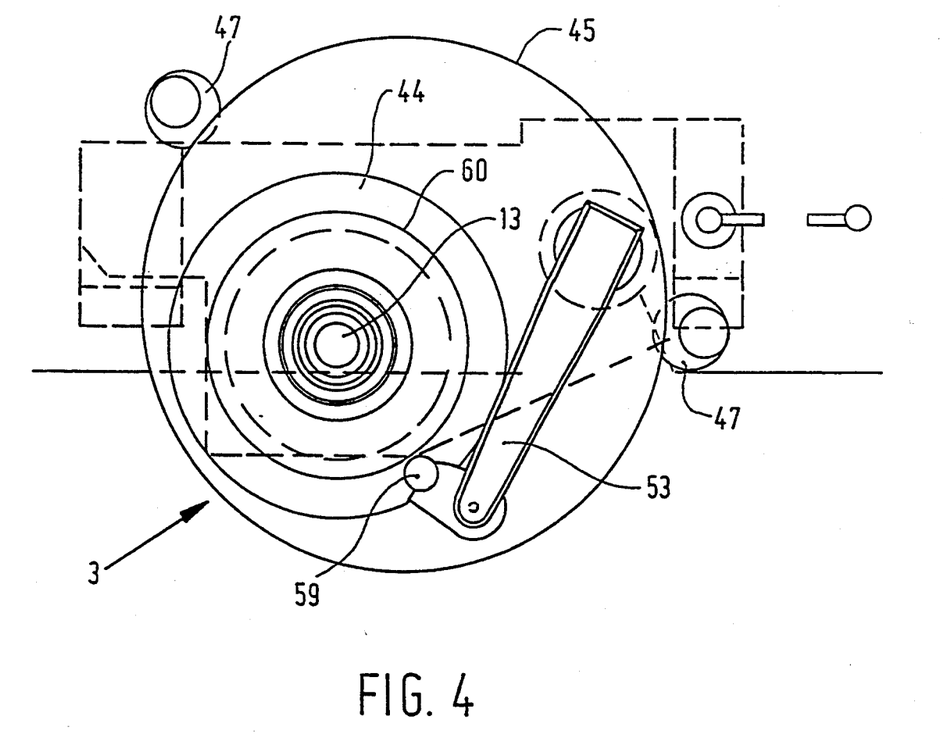
FIG. 4 is a plan view of parts of the processing station shown in FIG. 3.
Figure 5:
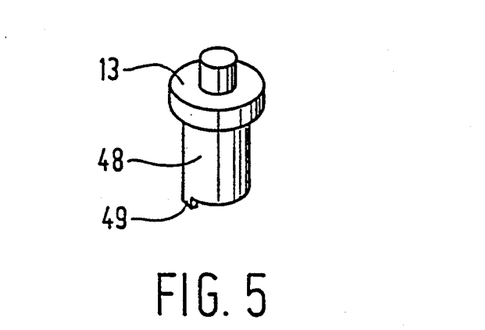
FIG. 5 is a perspective view of a supporting means used in the processing station of FIGS. 3 and 4, with a shaft connected thereto.

FIGS. 3–5 show parts: of the device disposed in station 3 for applying paint, whether or not transparent, on the upper side of a disc-shaped registration carrier, which is placed on the supporting means 13 disposed in the station in question. As is apparent from FIGS. 3 and 4, the supporting means 13 is located in a cup-shaped recess 44 in the station 3, which cup-shaped recess is, for example, eccentrically provided in a frame 45 having a circular section. Of course, other configurations are conceivable.

A circumferential groove 46 is provided in the outer periphery of the frame 45. Eccentric locking discs 47 engage said groove, which locking discs are rotatable about vertically extending axes and by means of which the frame 45 is detachably clamped down on the frame 1.

As is shown in FIG. 5, the supporting means 13 is secured to the end of a shaft 48 rotatably journalled in the frame 45 during normal operation. The bottom end of shaft 48, remote from the supporting means 13, is provided with projecting cams 49. Cams 49 engage corresponding recesses of a vertical outgoing shaft 50 of a driving motor 51 secured to the frame 1.

A vertical shaft 52 is furthermore located in the frame 45, an arm 53 being secured to the upper end of said shaft.

A lip 54 is secured to the bottom end of the shaft 52, said lip engaging a correspondingly shaped recess in the outgoing shaft 55 of a motor 56 secured to the frame 1.

One end of a paint supplying conduit 58 is connected, by means of a quick-action coupling 57, to a passage (not shown) provided in the shaft 52. The other end of conduit 58 is connected to a paint container, which is fitted with a filter and a pump, and which is disposed in the frame 1 so as to be readily exchangeable.

The conduit 58 is in communication with a paint delivery nozzle 59 mounted on the free end of the arm 53 via the passage provided in the shaft 52 and a further passage provided in the arm 53.

After a disc-shaped registration carrier 60 has been placed on the supporting means 13 located within the cup-shaped recess 44 in the above-described manner, and the above-described transport means has been pivoted back to its rest position, arm 53 can be pivoted, by motor 56, to a position where paint delivery nozzle 59 is located above carrier 60 at a point which is at least substantially located near the inner boundary of the paint film. The paint to be applied to the carrier 60 may or may not be transparent.

Then the supporting means 13, with the carrier 60 present thereon, is rotated by motor 51 while paint is simultaneously supplied through the nozzle 59. This allows a thin, annular bead of paint to be laid on the carrier 60. After that, the rotation of the supporting means 13 with the disc 60 present thereon is stopped and arm 53 is pivoted back to the position shown in FIG. 4. Then carrier 60 can be transported, in the above-described manner, to the next station 4 yet to be described in more detail hereafter.

After the eccentric discs 47 have been pivoted out of the groove 46, the processing unit provided with the frame 45 with the shafts 48 and 52 supported therein and the means supported by said shafts 48 and 52 can be listed so as to be removed from the device. Then frame 45, with the means supported by said frame and the paint container coupled thereto, can be removed. In the same manner, a similar frame with a paint container coupled thereto can be fitted to the frame 1 again, in the manner partially illustrated in FIGS. 3 and 4, whereby simultaneously a connection is again made between the shafts 48 and 52 and the motors 52 and 56. Thus, it is possible to make a quick and simple change-over from one type of paint to another.

As is further illustrated in FIG. 3, a temperature sensor 61 is disposed in the cup-shaped recess 44 for measuring the temperature of the carrier 60 in the station 3, where the paint is applied. As will be apparent from FIG. 3, sensor 61 is screened by the metallized carrier 60 located thereabove during operation. Consequently, sensor 61 is not influenced by, for example, light sources or the like disposed near the device, since the metal film on the carrier blocks the surrounding radiation. This contributes towards a reliable temperature measurement.

Dependent on the temperature sensed it will be possible, for example, to influence the amount of paint supplied in station 3 and/or the number of revolutions with which the carrier 60 is rotated in the next station 4 for spreading the paint over the carrier surface. This also helps to obtain an optimal coating and the most uniform possible distribution of the paint over the desired surface of the carrier 60.

Figure 6:
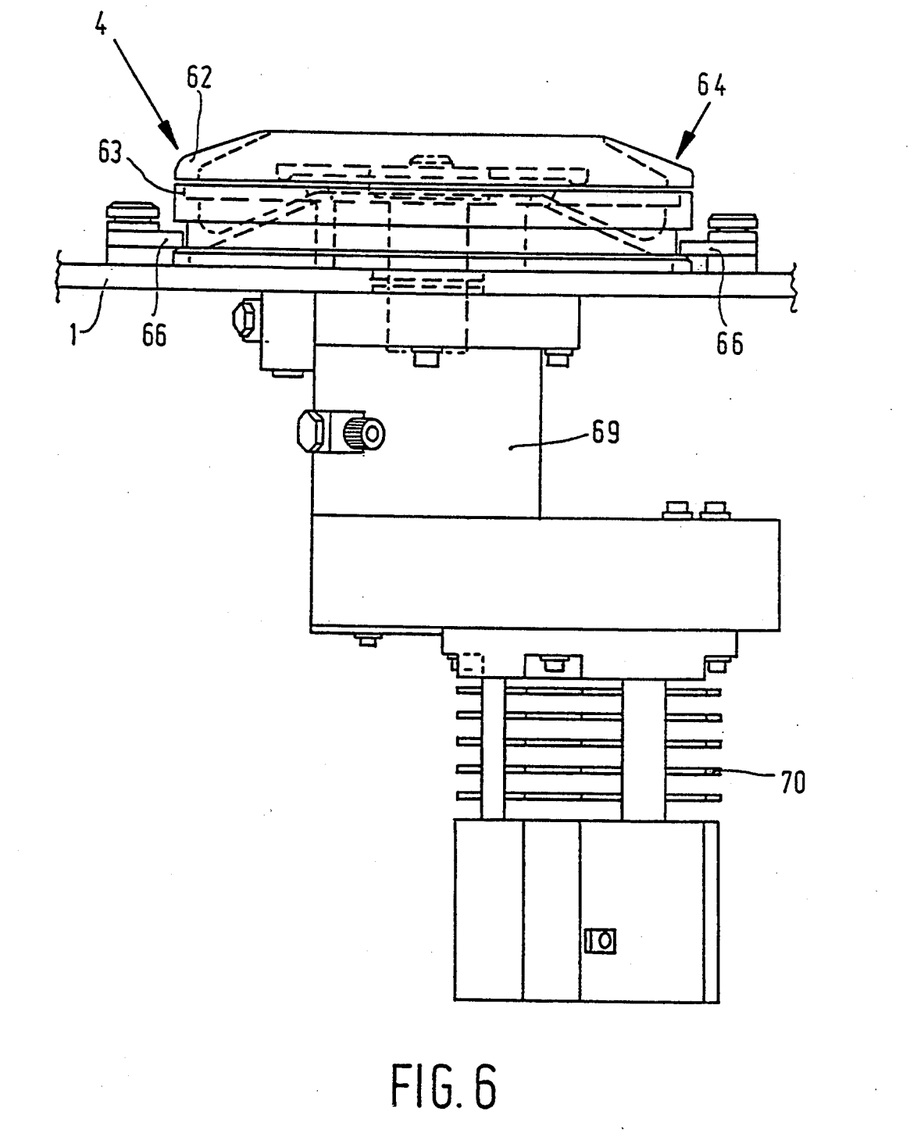
FIG. 6 is an elevational view of a further processing station.
Figure 7:
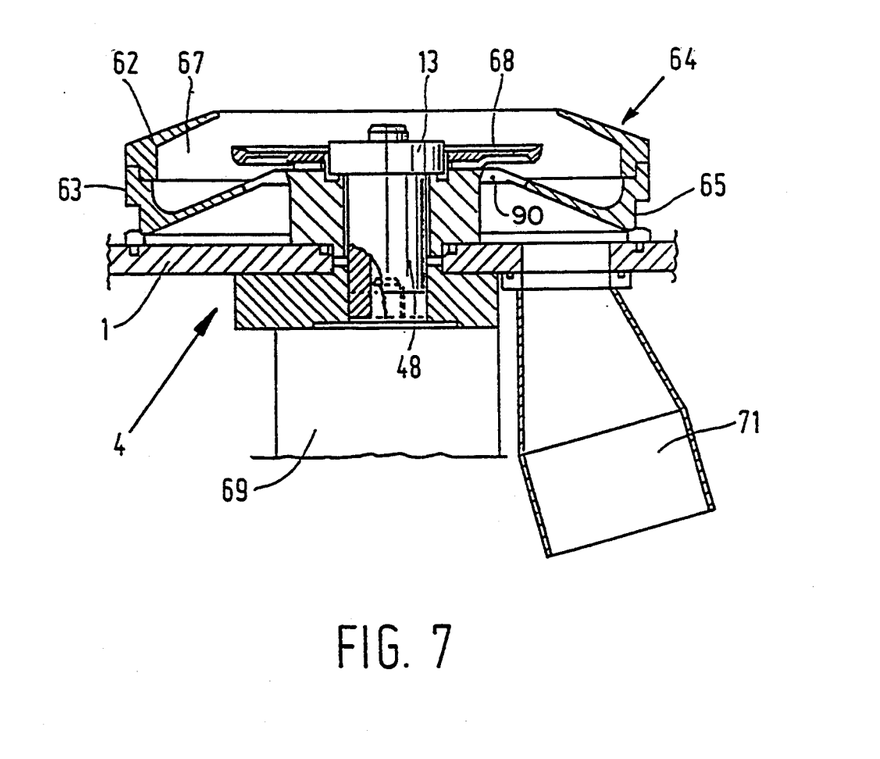
FIG. 7 is a sectional view of a part of the processing station shown in FIG. 6.

As illustrated in FIGS. 6 and 7, a frame 64 built up of two dish-shaped parts 62 and 63, formed one on top of the other, is disposed in the station 4., In the lower dish-shaped part 63 a circumferential groove 65 is provided, which receives eccentric discs 66, corresponding with the eccentric discs 46 illustrated in FIGS. 3 and 4, so as to clamp frame 64 to frame 1. Eccentric discs 66 form locking arrangement that permits frame 64 to be clamped but in a readily and quickly detachable manner.

Dish-shaped parts 62 and 63 of frame 64 bound a cup-shaped recess 67, in which the supporting means 13 associated with the station 4 is disposed, together with a plate-shaped means 68 secured thereto for supporting the carrier 60.

In a similar manner as set forth above, shaft 48, as shown in FIGS. 5 and 7, is connected to the supporting means 13, and is coupled by projecting cams: 49 to the outgoing shaft of a transmission mechanism 69 secured to the frame 1 thereby allowing supporting means 13 to be rotated by driving motor 70, shown in FIG. 6.

When a carrier 60, on which a bead of paint has been provided in the above-described manner, has been placed on the supporting means 13 and the plate-shaped means 68 secured thereto, the carrier 60 will be rotated at a high number of revolutions, so that the paint will uniformly move over the upper surface of the plate in outward direction. Any excess paint will be flung off the outer edge of the carrier 60 and be caught by the walls of the recess 67. Any excess paint may be carried away through passages 90 provided in the dish-shaped part 63 and a discharge conduit 71.

It will be apparent that when a change-over is made to another paint type also, the processing unit provided with the frame 64 and the shaft 48 journalled therein, the supporting means 13 and the plate-shaped part 68 can be readily and quickly removed and be replaced by another, similar frame 64. This enables a quick change-over to another series of registration carriers. Of course, in principle, the quickly exchangeable frame 64 with the associated means may also be of a different construction.

In station 5 the coat of paint applied in the above-described manner is dried and/or cured. Use is hereby made of the device shown in FIG. 8. This device is comprised of a cabinet 72, in which a housing 74 accommodating a reflector 73 is provided. At its bottom edge, the reflector 73 is provided with a projecting flange 75, which is clamped down against the bottom side of the housing 74 by means of a clamping ring 76.

Figure 8:
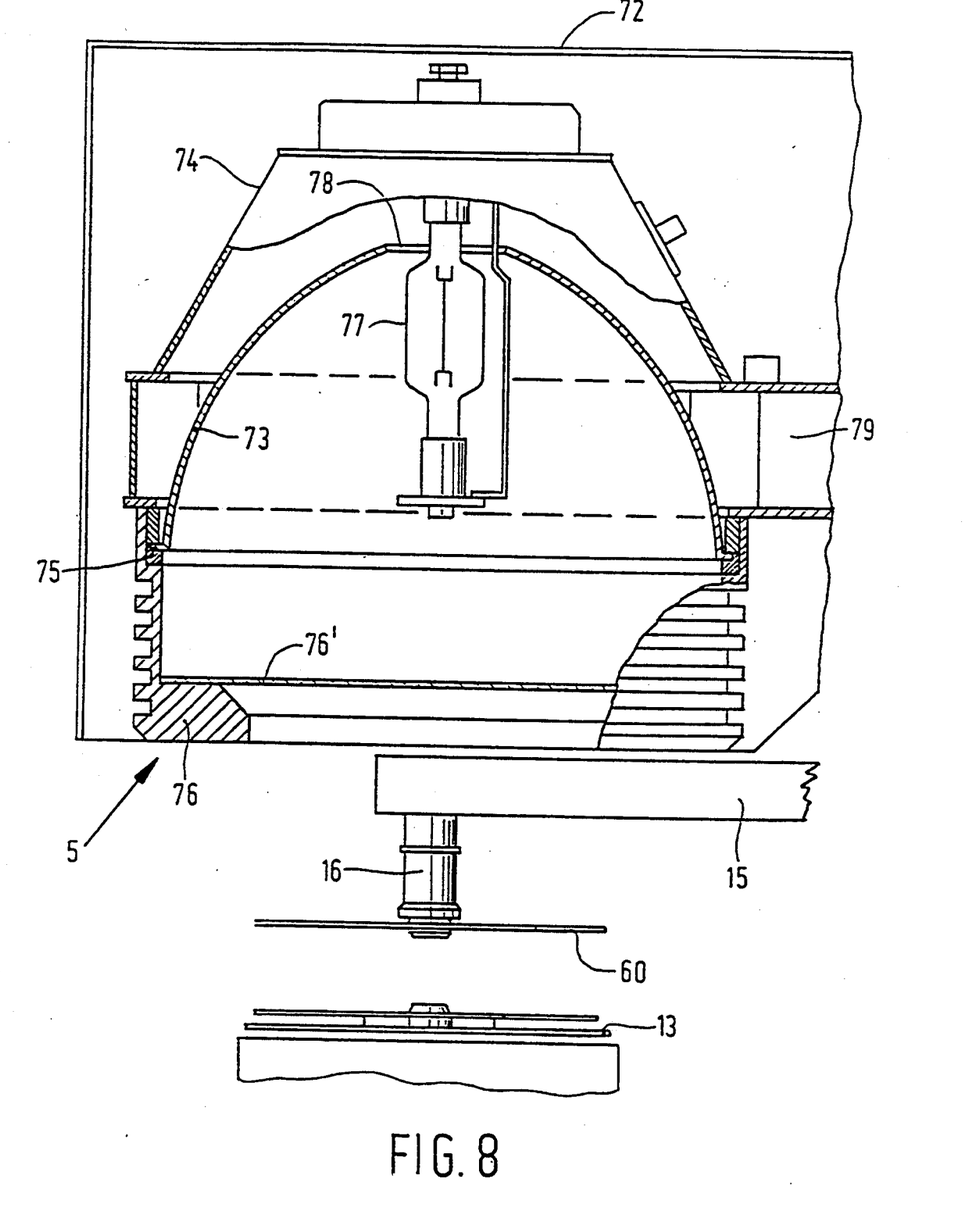
FIG. 8 is a sectional view of a further processing station.

An opening 78 is provided in the reflector 73 near the upper side of the reflector for allowing a tubular UV light source 77 to pass therethrough. The UV light source is supported by the housing 74, via which opening the space surrounded by the reflector 73 is also in open communication with the interior of the housing 74. A conduit 79 is provided on the housing 74, to which an exhaust device (not shown) is connected for exhausting air from the interior of the housing 74 and thus also from the interior of the reflector 73.

As is furthermore diagrammatically shown in FIG. 8, a disc-shaped registration carrier can be placed on a supporting means 13 of the station 5 located under the cabinet 72, using a gripping means 16.

Figure 9:
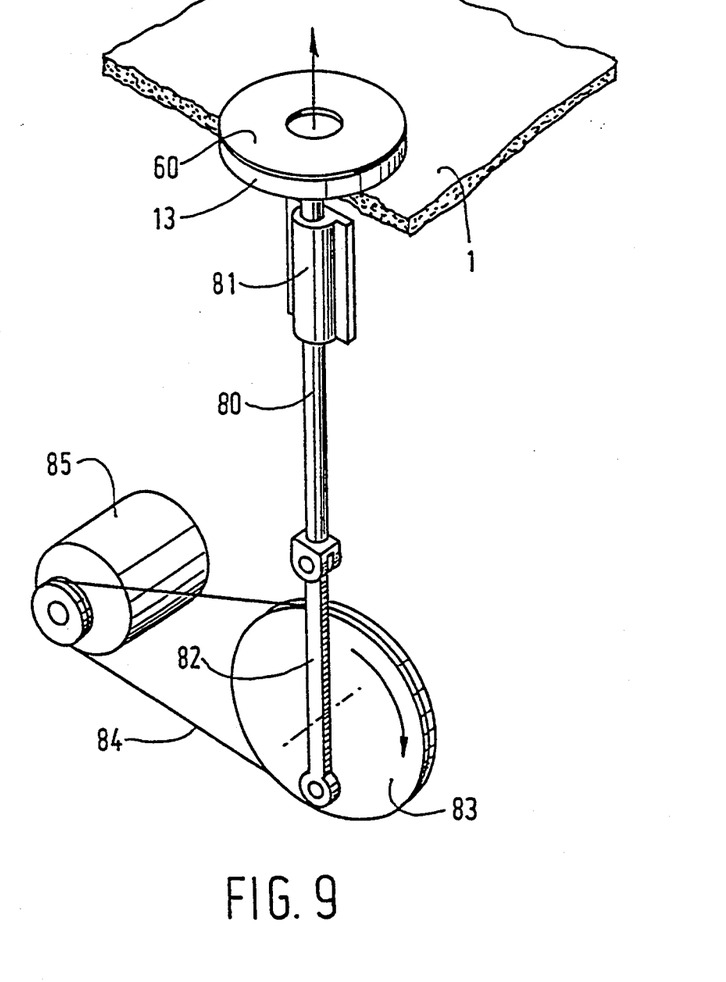
FIG. 9 is a diagrammatic, perspective view of a mechanism for moving up a supporting means for supporting a disc-shaped registration carrier in a processing station.

In order to move the disc-shaped registration carriers into the desired position with respect to the reflector 73 for drying and/or curing, the supporting means 13 in station 5 is vertically movable, in the manner diagrammatically indicated in FIG. 9. As illustrated there, the supporting means 13 is secured to the upper end of a vertical rod 80, which is movably guided in a guide bushing 81 secured to frame 1. One end of a coupling rod 82 is pivotally coupled to the bottom end of rod 80. The other end of coupling rod 82 is coupled to a disc 83 at a point located some distance from the axis of rotation of the disc. Disc 83 can be rotated via a belt 84, by means of an electric stepping motor 85 secured to frame 1. It will be apparent that when disc 83 is rotated from the position shown in FIG. 9 through half a turn by means of the stepping motor 85, the supporting means 13 will be moved from its lowermost position, illustrated in FIG. 9, to its uppermost position. At the uppermost position, carrier 60 is supported by the supporting means 13 and will be positioned with respect to the reflect 73 within the ring 76, which is suitable for drying and/or curing.

By using a reflector forming a body of revolution, on whose central axis a light source is vertically disposed, a uniform irradiation of the surface of the carrier 60 to be dried and/or cured can be effected, without it being necessary to rotate the carrier thereby.

This in contrast to constructions usual so far, wherein a registration carrier is rotated under a lamp illuminating a linear strip.

Furthermore, an illumination of the side edge can be effected simultaneously with an illumination of the upper surface, so that it is not necessary, in contrast to the devices usual so far, to provide one or more extra light sources and/or mirrors for drying and/or curing any paint present on the side edge.

It is possible thereby to use a short tube lamp, which contributes towards a compact construction.

In order to prevent undesirable heating of the supporting means disposed in station 5, or of a carrier 60 supported on the supporting means when for some reason or other the machine is at a standstill for a prolonged period of time, a construction may be provided wherein the reflector 73 and the light source 77 are vertically movable with respect to each other. When the reflector 73 is moved some distance downward with respect to the light source 77 during a period of standstill of the machine, the light source 77 will come to lie, at least substantially so, outside the point of focus of the reflector 73. Thus, irradiation of a carrier 60 possibly present in the station 5 can be avoided, at least substantially so, as a result of which undesirable overheating of the carrier 60 can be avoided.

Also, it will be possible to provide a UV radiation transmitting filter 76', for example, a glass filter, between the lamp 77 and the carrier 60, so as to prevent excessive heating of the registration carrier.

Excessive heating of the registration carrier can, for example, also be prevented by designing the reflector in such a manner that the reflector reflects UV radiation, but transmits other types of radiation.

Furthermore, the device according to the invention will preferably be provided with means which switch the lamp output to a lower level, for example, to 50% of the normal capacity during those periods of operation in which the lamp is not directly used for drying and/or curing of the paint applied on the registration carrier.

Instead of the above-described UV lamp, it is conceivable to use a processing unit provided with a source of heat for drying and/or curing the paint with the device according to the invention.

If desired, a print may be applied on the coat of paint thus dried and/or cured in station 7, by means of a processing unit disposed at said station, which print can be dried again in the above-described manner in station 8, by means of a suitable processing unit.

The processing unit shown in FIGS. 10 and 11 may be disposed in, for example, station 10 for checking the registration carrier. This processing unit comprises two light sources 86 and 87, which illuminate the carrier 60 from the bottom side in accordance with a radially extending line, as will be apparent from the diagrammatic perspective arrangement shown in FIG. 11.

The light that falls on the bottom side of the carrier 60 from the light source 86 is reflected to a camera 88, while the light that falls on the bottom side of the carrier 60 from the light source 87 is reflected to a camera 89. During the scanning process the carrier 60 is gradually rotated, so that the entire surface of the carrier 60 can be scanned. Dependent on the nature of the reflected light received by the cameras 88 and 89, it can be determined whether or not the carrier satisfies the demands made.

By making use in accordance with the invention of two light sources, which irradiate the registration carrier at different angles, and of two cameras, which each receive the light emitted from a light source and reflected by the sound carrier, a certain correlation can be ascertained from the signals which are derived from the light received by the cameras. As a result of this correlation, it is possible to distinguish between various faults, and in many cases also to establish the nature of the fault directly.

According to the invention, use is made of light-emitting diodes for illuminating the carrier, instead of using halogen lamps and/or fluorescent lamps, as has been usual so far. Surprisingly, it has become apparent that by using light-emitting diodes and a system of two cylindrical lenses, a particularly uniform lighting of the carriers 60 can be effected, so that a much more accurate determination of any faults present in the surface of the carrier 60 can be made, while at the same time the life span of such light-emitting diodes appears to be considerably longer than that of the halogen or fluorescent lamps that have been usual so far.

Preferably the construction is such that the light emanating from one light source is polarized on the registration carrier, while the camera is provided with a quarter labda plate and analyzer. As a result, no light will be detected by the camera in the absence of double refraction in the carrier, so that the light detected by the camera is a measure for the double fracture present in the carrier. Although both light sources illuminate the registration carrier along the same line in the illustrated embodiment, it will be apparent that they may illuminate the registration carrier in points located at some distance from each other, whereby the distance must, of course, be taken into account when processing the data obtained from the illumination.

Dependent on the quality of a carrier 60 examined signals are generated in the station 10, in such a manner that in station 11 rejected carriers 60 are stacked on, for example, a pin disposed in station 11, while in station 12 approved carriers are stacked on, for example, a pin disposed in station 12.

Full pins are discharged from the respective stations 11 and 12, using means which are known per se and which will not be described in more detail herein.

The various processing units such as, for example, a drying and/or curing device, a printing device or the like, are preferably modular units, can be readily fitted on the frame 1 or removed therefrom. Consequently, the device can be readily and quickly adapted to the demands made of the manufacturing process, such as, for example, when changing over to a registration carrier to be provided with a coat of paint of a different color and/or with a different print. Also, maintenance and repair work is made simpler and faster to carry out, since a processing unit which needs to undergo maintenance or repair work can be exchanged for a corresponding processing unit. Thus, it will, for example, be possible to provide several printing devices and/or illumination devices and/or heating devices. This makes it possible to use two-color printing or preparing the one printing device for use while the other is in operation. As will be apparent from FIG. 1, further arms with gripping means 16 secured thereto may be provided at the location for the arms 15' shown in dotted lines, as well as additional stations provided near said arms.

By making use of the device according to the invention, a great flexibility in the processing of disc-shaped registration carriers can be effected.

Because arms 15 moving the carriers are located between the successive stations in the rest position, disc-shaped registration carriers supported by the supporting means can be moved upwards and downwards without any problems in the respective stations, if necessary, as can the appropriate parts of the devices processing and/or examining the disc-shaped registration carriers.

Since at least some of the processing units are readily exchangeable, it is possible to adapt the device in a quick and simple manner in case of a change of the intended processing of the registration carriers. Also, maintenance and/or repair work to the processing units need not result in a standstill of the operation of the entire device.

What is claimed is:

1. A device for processing disc-shaped carriers among a plurality of processing stations mounted to the device in a spaced apart manner by at least substantially equal angular distances along a curved path, said device comprising a plurality of process stations, transport means for transporting carriers among the processing stations and being movable relative to a vertical axis of rotation, said transport means being fitted with gripping means for gripping and moving carriers to be processed between processing stations, drive means for driving said transport means in a first direction thereby moving said gripping means to a position above a carrier located in a processing station and driving said transport means in a direction opposite to said first direction to transfer the carrier from one processing station to a following processing station, said processing stations each include supporting means for supporting the disc-shaped carriers and at least some of said processing stations being removably mounted to said device, and further including at least one cam mechanism drivingly connected to said transport means, said cam mechanism including two cam discs connected to a driving shaft, said cam discs cooperatively connected to follower members secured to arms which are pivotable about pivot pins extending parallel to said driving shaft and which are disposed on either side of said cam discs, while the ends of the arms remote from the pivot pins are connected by a spring mechanism pulling the arms towards each other and at least one drive linkage extending from said follower members to said transport means.

2. A device according to claim 1, wherein said arms comprise a pair of arms driven by a cam disc, said pair of arms being connected to a pivotable annular means by way of a coupling rod and a connecting rod.

3. A device comprising with a number of processing stations, which are arranged along a curved path, spaced apart by at least substantially equal angular distances, with a transport means which is pivotable about a vertical axis of rotation, said transport means being fitted with gripping means for taking hold of and moving products to be processed between the various processing stations, and with driving means for said pivotable transport means, by which said transport means is pivotable in a first direction, so as to be able to move said gripping means to a position above a product located in a processing station, upon which the transport means is pivotable in opposite direction, so as to be able to transfer the product from one processing station to a following processing station, whereby said processing stations are fitted with supporting means for supporting disc-shaped registration carriers, and at least some of said stations are fitted with exchangeable processing units, said transport means comprising an annular means, which is pivotable about said axis of rotation, to which said gripping means are connected and which is capable of reciprocating pivotal movement by means of a driving mechanism, said annular means being rotatably supported by a second co-axial annular means, which is rotatable with respect to a third co-axial annular means, and whereby one of said second or said third annular means is provided with a wave-shaped guide path, which mates with a follow-on means connected to the other of said third or said second annular means, said third annular means being capable of reciprocating movement by means of a driving mechanism.

4. A device according to claim 3, further including a cam mechanism for driving said annular means, which cam mechanism is provided with two cam discs connected to a driving shaft, said cam discs cooperatively connected to said follow-on means, which are secured to arms which are pivotable about pivot pins extending parallel to said driving shaft and which are deposed on either side of said cam discs, while the ends of the arms remote from the pivot pins are connected by a spring mechanism pulling the arm towards each other.

5. A device according to claim 4, wherein said arms comprise a pair of arms driven by a cam disc, said pair of arms being connected to a pivotable annular means by way of a coupling rod and a connecting rod.

6. A device according to claim 3, wherein said gripping means are secured to telescoping arms.

7. A device according to claim 3 further including a processing unit at a processing station, which processing unit is provided with a detachable frame supporting the supporting means of the respective station, said supporting means being disposed in a recess formed in the frame, the dimension of said recess being such that the upper surface of a disc-shaped registration carrier placed on the respective supporting means, is located below the upper boundary of said recess.

8. A device according to claim 7, including a pivotable arm supported by the frame adjacent said processing station, said arm being pivotable between a first non-operative position, in which said arm is located beside the recess in the frame, and a second position for applying paint on said disc-shaped registration carrier through a paint discharge opening of a paint delivery nozzle mounted on a free end of the arm and located over the disc-shaped registration carrier.

9. A device according to claim 7, further including a temperature sensor means in said processing station to sense the temperature of the registration carrier and generate a signal in response to the sensed temperature for controlling processing parameters in said device.

10. A device according to claim 9, wherein said temperature sensor is arranged in such a manner that when the paint is being applied on the registration carrier, said temperature sensor is screened by the registration carrier.

11. A device according to claim 7, wherein said detachable frame is connected to an exchangeable conduit provided in the device.

12. A device according to claim 9, further including a processing unit in a further processing station for spinning said registration carrier, said processing unit being provided with a frame and with a support means supported by said frame at a position following said paint applying station, and means for spinning said supporting means so as to spread applied paint over the surface of the registration carrier.

13. A device according to claim 12, further including means for controlling the number of revolutions of said supporting means in the spinning processing unit in dependence on the temperature sensed for the registration carrier.

14. A device according to claim 12, further including a processing station for drying the paint applied on the disc-shaped registration carrier, said station including a reflector constituting a body of revolution with a vertically disposed tubular light source at least substantially arranged at a point of focus of the reflector, so that light emitted by the reflector is uniformly spread over the registration carrier surface.

15. A device according to claim 14, wherein the tubular light source is a UV light source and is disposed in the reflector.

16. A device according to claim 15, further including a filter for transmitting UV light disposed between said UV light source and said supporting means for the registration carrier.

17. A device according to claim 14, wherein said reflector and said light source are vertically adjustable with respect to each other, in such a manner that the reflector can be moved to a position relative to the light source in which at least a substantial portion of the light emitted by the light source is not reflected on a disc-shaped registration carrier.

18. A device as in claim 3, wherein at least one of said processing stations includes means for vertically adjusting a supporting means for supporting the disc-shaped registration carrier.

19. A device as in claim 3 further including a quality check station having a processing unit comprised of two light sources, positioned to illuminate a surface of a disc-shaped registration carrier in said quality check station, and light receiving means disposed to receive the light emanating from each light source and reflected by the registration carrier so as to determine the quality of the carrier, and to produce a signal corresponding to the determined quality, while means are provided for delivering an approval or rejection signal in dependence on the light image detected by the light receiving means.

20. A device as in claim 19 further including means responsive to said quality signal for separating approved and rejected registration carriers.

21. A device as in claim 19 wherein said two light sources are positioned to illuminate a registration carrier at two different angles.

22. A device as in claim 21 wherein said two light sources are positioned to illuminate a registration carrier along radially extending lines.

23. A device according to claim 19 wherein the light sources comprising light-emitting diodes.

24. A carrier processing device as in claim 3 wherein said drive means moves said transport means pivotally and vertically with respect to said vertical axis of rotation.

25. A carrier processing device as in claim 3 wherein said transport means further comprises a support member mounted so as to be pivotable about and moveable along said vertical axis of rotation and is driven in reciprocating movement by said drive means, said gripping means being connected to said support member and moveable therewith.

* * * * *